United States Patent
Dureau (12) 
(10) Patent No.: US 6,345,389 B1
(45) Date of Patent: *Feb. 5, 2002

(54) INTERACTIVE TELEVISION SYSTEM AND METHOD FOR CONVERTING NON-TEXTUAL INFORMATION TO TEXTUAL INFORMATION BY A REMOTE SERVER

(75) Inventor: Vincent Dureau, Palo Alto, CA (US)

(73) Assignee: OpenTV, Inc., Mountainview, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,611

(22) Filed: Oct. 21, 1998

(51) Int. Cl.[7] ............................................... H04N 7/173
(52) U.S. Cl. ........................................ 725/116; 725/133
(58) Field of Search ............................... 348/1, 2, 6, 10, 348/12, 13, 14; 455/2, 3.1, 6.1, 5.1, 6.2, 6.3; 345/327; 382/187, 189; 704/235; 725/131, 132, 116, 139, 140, 151, 152, 133

(56) References Cited

U.S. PATENT DOCUMENTS

| | | | | |
|---|---|---|---|---|
| 5,528,743 A | * | 6/1996 | Tou et al. ..................... | 707/541 |
| 5,546,538 A | * | 8/1996 | Cobbley et al. ........ | 395/200.01 |
| 5,812,931 A | * | 9/1998 | Yuen .......................... | 455/5.1 |
| 5,831,664 A | * | 11/1998 | Wharton et al. .............. | 348/13 |
| 5,861,881 A | * | 1/1999 | Freeman et al. ............ | 345/302 |
| 5,875,448 A | * | 2/1999 | Boys et al. .................. | 707/531 |

FOREIGN PATENT DOCUMENTS

| | | |
|---|---|---|
| EP | 0 633 661 | 1/1995 |
| EP | 0 689 155 | 7/1996 |
| EP | 0 838 945 | 4/1998 |

OTHER PUBLICATIONS

"Speech Recognition Methods for Controlling Cable Television," IBM Technical Disclosure Bulletin, vol. 38, No. 8, Aug. 1995, pp. 285–287.

International Search Report, Application No. PCT/US99/24710, mailed Feb. 15, 2000.

\* cited by examiner

*Primary Examiner*—Chris Grant
(74) *Attorney, Agent, or Firm*—Conley, Rose & Tayon, PC

(57) ABSTRACT

A system and method for providing user input to an application executing on an interactive television system wherein a user provides non-textual information to the interactive television system and this information is converted by a server to textual information which is provided to the application. In one embodiment, a digitizer pad coupled to a set-top box is used to digitize the user's handwriting. The digitized information is conveyed to a remote server which converts the digitized handwriting data into textual information. The textual information is conveyed to the set-top box, where it is input to an application executing on the set-top box. In another embodiment, a microphone is coupled to a set-top box. The microphone allows the user to input voice information which is digitized and conveyed to the server for conversion into textual information. The textual information is conveyed back to the set-top box and is input to an application executing on the set-top box.

22 Claims, 3 Drawing Sheets

INTERACTIVE TELEVISION SYSTEM AND METHOD FOR CONVERTING NON-TEXTUAL INFORMATION TO TEXTUAL INFORMATION BY A REMOTE SERVER

BACKGROUND OF THE INVENTION

1. Field of the Invention

The invention relates generally to interactive television systems and more particularly to means and methods for using a server to convert user-provided information into a data format which can be used by an interactive television application.

2. Description of the Relevant Art

Interactive television systems can be used to provide a variety of services to users. These systems are capable of displaying text and graphic images to facilitate viewer interaction as well as the audio and video streams associated with ordinary television programs. Interactive television systems enable viewer interaction and thereby allow the systems to be used for marketing and educational purposes in addition to extending the entertainment capabilities of an ordinary television. Viewers can order advertised products or services, request information regarding particular programs, or send electronic messages (e-mail).

In a typical interactive television system, a broadcast service provider generates an interactive television signal for transmission to a viewer's television. The interactive television signal includes an audio-video portion consisting of a television program, as well as an interactive portion consisting of application code or control information. The broadcast service provider combines the audio-video and interactive portions into a single signal for transmission to a receiver connected to the user's television. The signal is typically compressed prior to transmission and transmitted through broadcast channels such as cable television (CATV) lines or direct satellite transmission systems.

The interactive functionality of the interactive television system is controlled by a set-top box connected to the television. The set-top box receives the signal transmitted by the broadcast service provider, separates the interactive portion from the audio-video portion and decompresses the respective portions of the signal. If the interactive portion of the signal comprises an interactive application, the application may be executed while the audio-video information (the normal television signal) is conveyed to the television. The set-top box may combine the audio-video information with interactive graphics or audio generated by the interactive application prior to conveying the information to the television. The interactive graphics and audio may present additional information to the viewer or may prompt the viewer for input and may be designed to function in response to signals in the broadcast or actions taken by the viewer. An interactive television system may also run applications that present the user only with the audio and graphics relating to the interactive application. In other words, this information may be displayed in place of the normal television signal, rather than adding to the signal.

There are various examples of interactive applications which require viewer input. One example is a televised buying service in which a series of products are displayed via a television program and the viewer utilizes the interactive functions of the television system to purchase the displayed products. The viewer must identify the product he or she wishes to purchase and may also need to provide size, color, and other information descriptive of the product. This information may be provided by selecting the appropriate choice from a menu. The application may, however, also require the user's name or shipping information which cannot simply be selected from a menu. Another example of an application which requires textual information is a messaging application for which the viewer must provide the message, as well as information identifying the addressee of the message. Some means is therefore necessary to enter this textual information.

One option for entering text would be to use a keyboard. This might not be the best solution, however, because some users may not feel comfortable using a keyboard. One of the attractions of interactive television systems is the ease with which they may be used. Interactive television applications are designed to provide simplified user interfaces and many require no more input than can be provided using a basic remote control. The requirement of entering textual information via a keyboard may make the interactive television system less attractive to users because of the additional hardware which is required for the system, the perceived complexity of the system or the difficulty which may be experienced by some users in typing the necessary information. Further, in some languages (e.g., Chinese,) the complexity of the written language makes text entry via a keyboard difficult even for experienced users.

Other options for providing textual information to an application may involve means for converting non-textual information into a textual form. For example, using voice recognition technology, a user's voice can be sampled and compared to previously sampled speech patterns to determine the words spoken by the user. The words can then be output by the speech recognition system as text. Handwriting recognition systems could also be used to generate textual information for the application. These systems perform the same process on images of the user's handwriting (entered via a graphics tablet or similar input device) to determine the text written by the user. While these technologies have evolved to the point that they can reliably generate accurate textual information from the user's voice or handwriting, they require a great deal of computer resources. The applications may be very large and they need large amounts of processing time to perform the required pattern matching. These technologies therefore cannot be implemented in current set-top boxes, which have very limited storage and processing capacity.

SUMMARY OF THE INVENTION

One or more of the problems outlined above may be solved by the various embodiments of the invention. The invention comprises a system and method for enabling a user to provide non-textual information which is converted by the system to a textual form in which it can be used by the interactive application. The non-textual information is entered by the user at the set-top box of a receiving station and this information is transmitted to a server which may be located at a broadcast station. The server converts the information into textual data so that it can be used by the system. In one embodiment, the server transmits the textual data back to the receiving station, where it can be used by an application executing in the set-top box. In other embodiments, the textual data can be used at the server or transmitted to a part of the system other than the set-top box.

One embodiment comprises an interactive television system comprising a broadcast station and a receiving station. The broadcast station transmits an interactive television application to the receiving station, which then executes the application. The application requires textual data from the user. The receiving station includes a set-top box which executes the application and a graphics tablet which is coupled to the set-top box for entering information. The user provides the information by writing on the graphics tablet, which generates an image file. The image file is transmitted from the set-top box to the broadcast station. The broadcast station includes a server which uses handwriting recognition software to convert the image file into character or textual data. The textual data is transmitted back to the application at the set-top box, which uses the data as if it had been typed in directly by the user.

Because the handwriting recognition software resides on the server computer instead of the set-top box, more resources are available for execution of the software. The server typically has more available memory and more processing power than the set-top box and consequently provides much faster recognition of handwriting images. The greater available resources enable the software to provide for recognition of additional, complex languages (e.g., Chinese) and extended character sets (e.g., unicode). Since the recognition software is maintained on the server, the software can be quickly and easily updated with the latest handwriting recognition technology, and it does not have to be distributed to the individual subscribers' set-top boxes.

In one embodiment, the textual data need not be sent back to the set-top box, but may instead be used at the server or another location remote from the set-top box. For example, a user may place an order for a product by entering oral or handwritten information and the order may be confirmed later by e-mail or other means. In another embodiment, the server could consist of a human operator who receives the audio or image data and manually transcribes it into textual information. The audio or image data may alternately be converted into textual information by automated means operating under human supervision.

In an alternate embodiment, the interactive television system includes a microphone rather than a graphics tablet for entry of information to the system. The microphone is used to provide voice data, which is recorded and transmitted to a server equipped with a voice recognition application. The voice recognition application converts the voice data into textual data, which is then transmitted back to the application executing on the set-top box.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the inventive method is described in detail below. In this embodiment, an interactive television system transmits an audio-video-interactive signal from a broadcast station to a receiving station via a broadcast channel. ("Broadcast" is used herein to refer to transmission of a single signal to all subscribing receivers.) The broadcast channel may comprise a direct satellite transmission channel or any known means for broadcasting a signal, including non-satellite, cable, telco, MMDS (microwave) and terrestrial transmissions. (A "direct" satellite transmission as used herein means a transmission received by the interactive television receiver directly from the satellite.). The receiving station in this embodiment is additionally configured to receive signals via a modem connection to the broadcast station.

The audio-video-interactive signal broadcast to the receiving station may contain both television programming and interactive information such as control signals or interactive applications. When the broadcast signal is received, it is separated into its components and processed (e.g., decompressed) to reconstruct the respective television programming and interactive signals. An interactive application which was broadcast to the receiving station or which was resident in the receiving station is executed on the microprocessor of the set-top box. The application is one which requires textual data from the user. The user, however, is allowed to input the data in a non-textual form. "Non-textual" as used herein means a form handled by the system as something other than a series of alphanumeric characters, such as the ASCII character set. A graphical representation of handwriting, although textual in nature, is handled as an image or as vectorized handwriting information and not as the characters or words which are written. "Textual," on the other hand, means one or more characters or words. If the system is set up for an English-speaking user, the characters may be from the ASCII character set. If the system is set up for a non-English-speaking user, the characters will be from the character set of the user's language (e.g., Kanji characters for a Japanese user).

The set-top box of the receiving station is configured with a device for non-textual data entry. In one embodiment, this device is a graphics tablet on which the user can inscribe (write) the information required by the application. The graphics tablet digitizes the user's handwriting and stores the digitized data as an image file. The set-top box transmits the file containing the digitized data to the broadcast station for conversion into a textual form. (The image data need not all be contained in a single file, and may be transmitted to the server in segments to spread out the processing load.) The broadcast station includes a server which is configured to transform image data into textual data using handwriting recognition algorithms. The broadcast station then transmits the textual data back to the receiving station. The application executing on the set-top box identifies the received textual data as corresponding to the image data which it earlier transmitted to the broadcast station. The set-top box accordingly utilizes the textual data as if it had been entered as text by the user of the set-top box and continues execution of the interactive television application.

Figure 1:
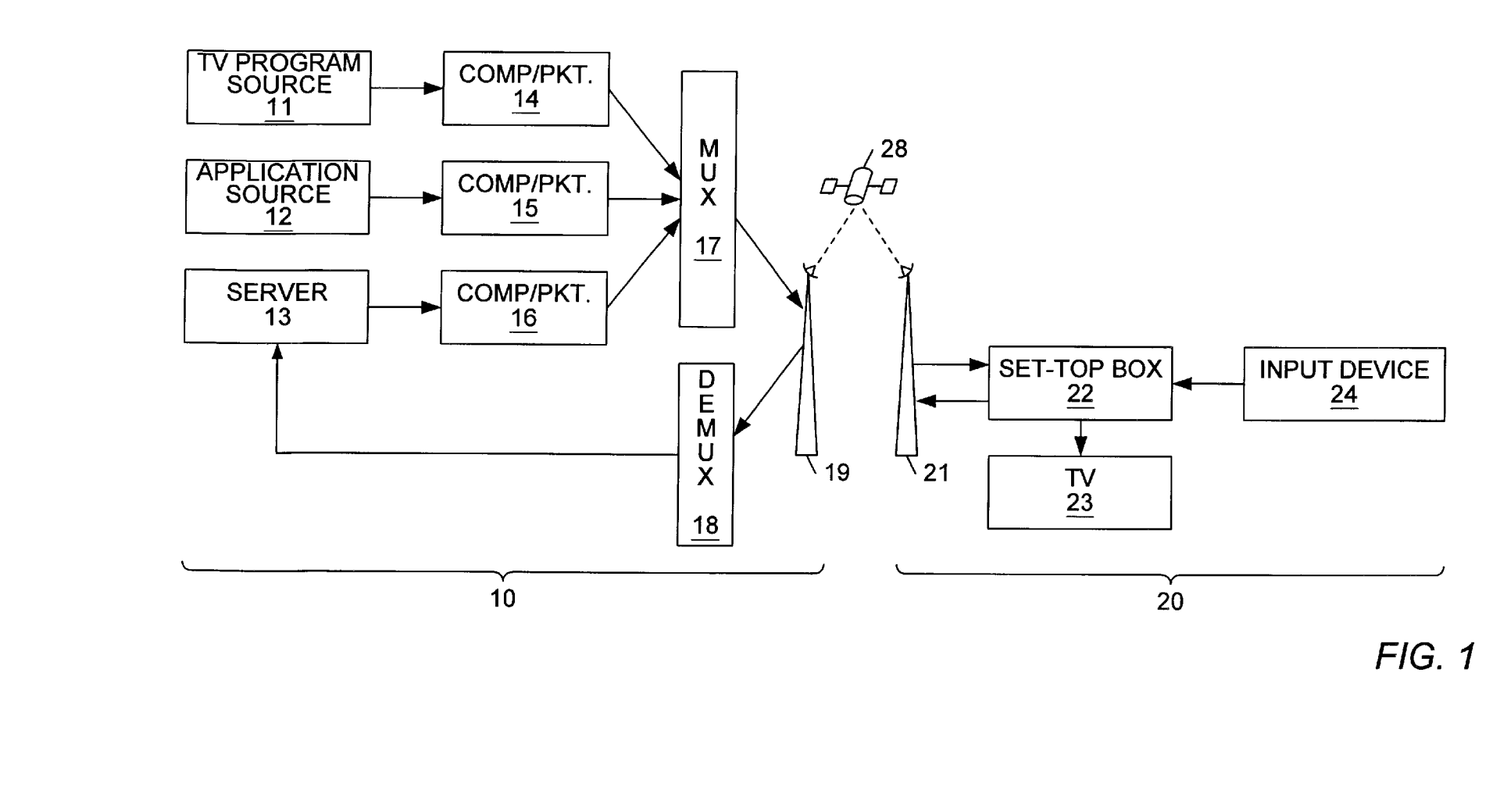
FIG. 1 is a block diagram illustrating one embodiment of a system for distribution of interactive television applications and television programs from their sources to a series of viewers.

Referring to FIG. 1, a block diagram illustrating a system for distribution of interactive television applications and television programs from their sources to a series of viewers is shown. Broadcast station 10 has a television program source 11 and an interactive application source 12. The television program source may include remote broadcast network feeds, videotape recorders, computers, data storage devices, and the like. Interactive application sources 12 may provide interactive applications, control information or audio or video information which is to be included in the interactive television signal. Additionally, broadcast station 10 includes a server 13, which is used to process non-textual data received at the broadcast station and generate textual data. The information generated by the television program source 11, interactive application source 12 and server 13 is typically processed by compression/packetization units 14–16 before it is broadcast. Usually, the information is also compressed in order to conserve bandwidth. (It should be noted that while this embodiment comprises a digital broadcast system, other embodiments may comprise analog broadcast systems in conjunction with means for transmitting digital application data. The analog broadcast systems may include existing television networks, and the means for transmitting the application data may include transmissions in the vertical blanking interval or parallel transmissions via telephone lines or out-of-band cable signals.)

Any of a number of compression algorithms, such as one of the Motion Picture Expert Group (MPEG) compression standards, may be used if appropriate for a particular program or application. The information is packetized to enable error checking, interleaving of data and other transmission-related functions. Additional data may accordingly be appended to the application and programming data. For example, error check sums may be appended for error detection/correction and time stamps may be included for the purpose of synchronizing associated audio and video signals. The packetized information from compression/ packetization units 14–16 is fed into multiplexing unit 17, which intersperses the packets prior to transmission. The interspersed packets are then broadcast to the receiving stations 20. (Although only one receiving station is shown in the figure, it is contemplated that the audio-video-interactive signal is broadcast to a group of subscribing receiving stations.) In the figure, the audio-video-interactive signal is depicted as being transmitted via satellite broadcast through antenna 19.

The broadcast signal is relayed by communications satellite 28 and received by receiving station 20. Although the figure illustrates a satellite transmission, it is contemplated that any broadcast medium (e.g., CATV or direct satellite transmission) may be used. Receiving station 20 is contemplated to be one of a number of such stations which are subscribers of the broadcast service provider operating broadcast station 10. The broadcast signal is collected by receiving antenna 21 and fed to set-top box 22. Set-top box 22 processes the packetized signal to reconstruct the television programs and interactive applications embodied in the signal. The reconstructed applications are executed in the set-top box, while the reconstructed television programs are passed to television 23, where they are displayed. (It is noted that television 23 can be any suitable monitor or display device.) The interactive applications may generate graphics or audio which are combined with the television program prior to being displayed. The interactive applications may also be displayed in place of the television programming.

In addition to the broadcast channel between the broadcast station and receiving station, there may be other channels, such as a modem channel (which may also be referred to as an http channel, or hypertext transfer protocol channel.) These types of channels serve two functions in the system: they allow the set-top box to provide data to the broadcast station; and they provide an alternate path for from sources 11–13 to be delivered to receiving station 20. It should also be noted that, if receiving station 20 and server 13 are connected via a transmission medium other than the broadcast station's broadcast channel and return path, the server is not constrained to be located at the broadcast station. It may be more convenient to locate server 13 at a site which is separate from broadcast station 10 in order to reduce the workload of the broadcast station, to more efficiently convey data between the receiving station and the server, or for other reasons.

Figure 2:
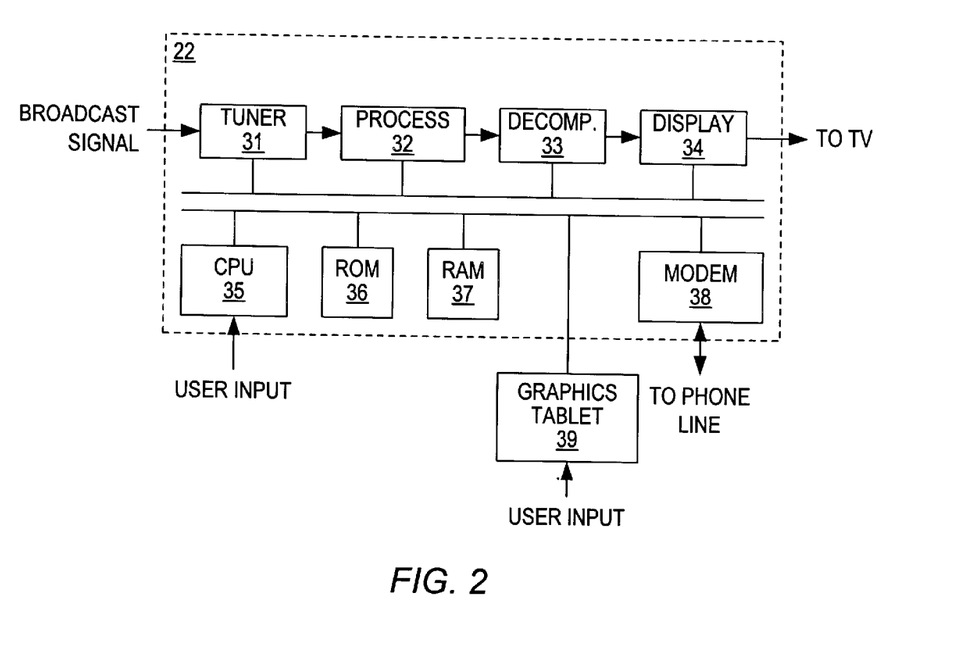
FIG. 2 is a block diagram of a set-top box in one embodiment of the invention.

Referring to FIG. 2, a block diagram of a set-top box 22 in one embodiment is shown. The broadcast signal is received and fed into tuner 31. Tuner 31 selects the channel on which the broadcast audio-video-interactive signal is transmitted and passes the signal to processing unit 32. (Tuner 31 may be replaced by other means, all collectively referred to herein as input ports, for receiving signals from various signal sources.) Processing unit 32 demultiplexes the packets from the broadcast signal if necessary and reconstructs the television programs and/or interactive applications embodied in the signal. The programs and applications are then decompressed by decompression unit 33. The audio and video information associated with the television programs embodied in the signal is then conveyed to display unit 34, which may perform further processing and conversion of the information into a suitable television format, such as NTSC or HDTV audio/video. Applications reconstructed from the broadcast signal are routed to random access memory (RAM) 37 and are executed by microprocessor 35. Graphics tablet 39 provides a means for the user to supply handwritten information for conversion to text and subsequent use by the applications. (In other embodiments, graphics tablet 39 may be replaced by a microphone for supplying voice data or some other type of input device for supplying non-textual information to the system.)

Microprocessor 35 may comprise various types of microprocessors, microcontrollers, digital signal processors (DSPs), or other types of software instruction processing devices, as are appropriate to the particular design. RAM 37 may include memory units which are static (e.g., SRAM), dynamic (e.g., DRAM), volatile or non-volatile (e.g., Flash memory), as required to support the functions of the set-top box. When power is applied to the set-top box, microprocessor 35 executes operating system code which is stored in ROM 36. (In some embodiments, ROM 36 may comprise Flash memory or EEPROMs.) The operating system code executes continuously while the set-top box is powered in the same manner the operating system code of a typical personal computer (PC) and enables the set-top box to act on control information and execute interactive and other applications. The set-top box also includes modem 38. Modem 38 provides both a return path by which viewer data can be transmitted to the broadcast station and an alternate path by which the broadcast station can transmit data to the set-top box.

Although the term "set-top box" is used herein, it is understood that this term refers to any receiver or processing unit for receiving and processing a transmitted signal and conveying the processed signal to a television or other monitor. The set-top box may be in a housing which physically sits on top of a television, it may be in some other location external to the television (e.g., on the side or back of the television or remotely located from the television), or it may be incorporated into the television itself. Alternatively, the functionality of the set-top box may be entirely removed from the television and placed in a more remote location, such as outside a house in which the settop box is located. Set-top box 22 serves to demodulate (if necessary) the signal received from broadcast station 10 and to separate the components of the signal, such as different television programs and interactive applications. Other embodiments of the set-top box may have different components or interconnections than those shown in FIG. 2. Similarly, television 23 may be a television or a video monitor employing any suitable television format (e.g., NTSC or HDTV), or it may be replaced by other devices, such as a video recorder, depending on the particular embodiment.

Figure 3:
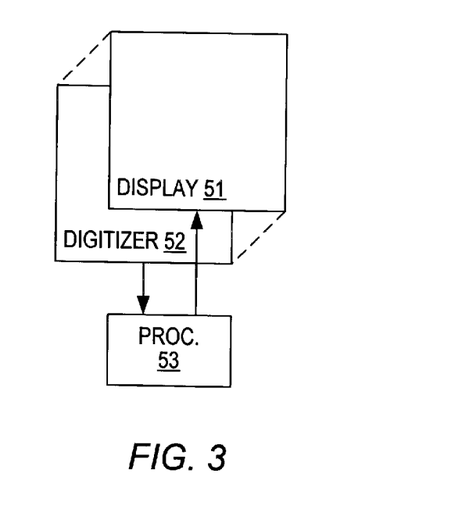
FIG. 3 is a block diagram illustrating the components of a graphics tablet in one embodiment of the invention.

Referring to FIG. 3, a block diagram illustrating the components of a graphics tablet 50 is shown. The main components of graphics tablet 50 are display 51, digitizer 52 and processor 53. Graphics tablet 50 can have a wide range of sizes, from several inches across (as used in pen computing systems) to several feet across (as used in some CAD systems). It is contemplated that the most convenient size for the graphics tablet will be the size of a small or medium sized notepad. The surface of graphics tablet 50 should be flat and smooth to facilitate use as a writing surface. Although graphics tablet 50 is contemplated to be connected to set-top box 22 by a data cable, infrared transmission or any other suitable transmission means may also be used to transmit data between graphics tablet 50 and set-top box 22. To the extent that graphics tablet 50 is not constrained by these data transmission means, the user should be able to move the tablet to a convenient and comfortable writing position.

Display 51 and digitizer 52 are overlaid so that the path of a digitizer pen (not shown) can be displayed as the user writes on the tablet, thereby simulating writing on a notepad. Display 51 is contemplated to be a flat panel display using LCD (liquid crystal diode) or similar technologies. These technologies use substances this those between two plates of glass to control the amount of light which passes through the display. Depending upon the chosen technology, the display may simply control the amount of light from any source behind the display, or it may generate varying amounts of light from each pixel in the display. The display can be configured to provide feedback to the user by displaying his or her handwriting, or it may display icons or other images representative of the user's input. The display may also be configured to display forms, or other prompts, in response to which the user can provide handwritten information. In an alternate embodiment, graphics tablet 50 may be simplified by eliminating display 51. In such an embodiment, the user could instead receive visual feedback, including prompts, forms, handwriting and other images through television 23.

The combination of display 51 and digitizer 52 should be selected to provide sufficient resolution to allow an accurate digital representation of the user's handwriting. It is contemplated that the resolution of the digitizer and display should be roughly equivalent to that of a fairly high-quality printer. The combination should also provide display quality (e.g., brightness and contrast) which makes the handwritten information easy for the user to see. Microprocessor 53 should be fast enough that the path of the digitizer pen is displayed without any substantial delay as it is drawn by the user. Although microprocessor 53 is shown separately from microprocessor 35, it is contemplated that a single device may be sufficient to perform both functions.

Digitizer 52 may also be constructed using one of a number of technologies. Although early technologies often used opaque structures, technologies used in modem digitizers are more likely to incorporate transparent panels which are designed to be used in conjunction with overlaid displays. Digitizer 52 may use electrostatic, resistive film or capacitive/electrostatic film technologies. Various embodiments of the invention may incorporate different ones of the technologies which are best suited to the particular embodiments. Digitizer 52 senses the position of the digitizer pen and transmits the corresponding X-Y coordinates to the set-top box. In one embodiment, this X-Y data is recorded as a series of darkened pixels in a bitmap image of the text written by the user. The image is then transmitted to the server for processing and recognition of the written data. The recognition of the bitmap image is sometimes referred to as off-line recognition.

In an alternate embodiment, digitizer 52 may sense not only X-Y position, but also the direction of the pen's path, the pen's angle, speed and acceleration, and other information which forms a vectorized representation of the user's handwriting. This vectorized information can be transmitted to the server as it is produced so that recognition can be performed as the user is writing. The use of vectorized information to recognize handwritten information is sometimes referred to as on-line recognition.

The receiving station is operatively connected to the broadcast station by a broadcast channel. This broadcast channel can utilize various transmission media and is contemplated to include media such as coaxial cable and free space (e.g., as used for direct satellite transmissions.) The broadcast channel forms a transmission path between the broadcast station and the receiving station. The broadcast station and receiving station are also connected by a return path. The return path typically consists of a pair of modems, one in the receiving station and one in the broadcast station, each connected to a standard telephone line. Other means for establishing a return path (e.g., using a portion of the bandwidth of the broadcast channel) are also contemplated. The system illustrated in FIG. 1 utilizes the broadcast channel to establish a return path for communicating data from the receiving station to the server.

Figure 4:
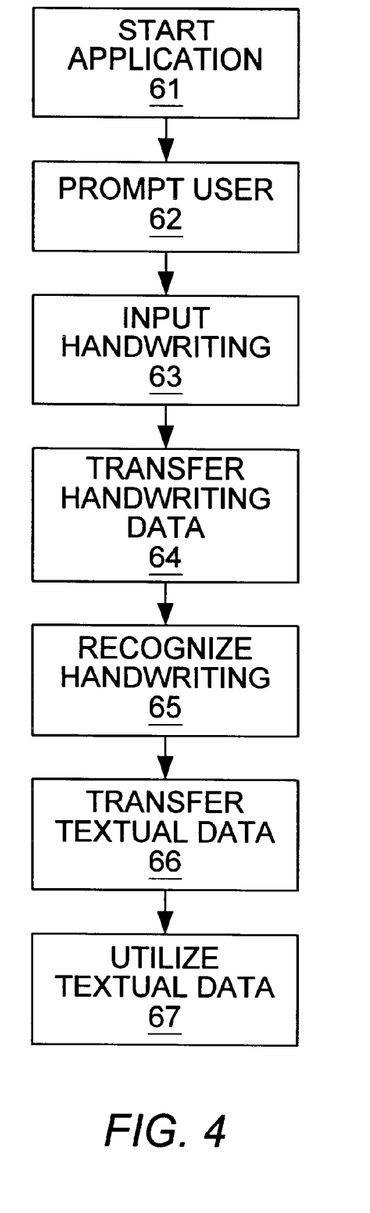
FIG. 4 is a flow diagram illustrating the flow of handwritten/textual information in one embodiment of the invention.

In one embodiment, an application is transmitted from the broadcast station to the receiving station, where it is reconstructed and executed. In alternate embodiments, the application may be resident in the set-top box or may be provided to the set-top box by means other than the broadcast channel (e.g., flash card.) FIG. 4 is a flow diagram illustrating the flow of handwritten/textual information in the system. While the application is executing 61, it prompts the user for some sort of textual information 62. The user enters the information on the graphics tablet 63, writing the information in his or her normal handwriting. The graphics tablet digitizes the image of the user's writing and conveys the digitized data to the set-top box, which transmits the information to the server 64 via the return path to the broadcast station. The image data is received by the broadcast station and passed on to the server. The server processes the image data 65, recognizing characters and/or words in the image and producing the equivalent textual data. This textual data is then transmitted back to the receiving station 66, either via the broadcast channel or via the return channel. The textual data is then utilized by the application executing in the set-top box 67 as if the text had been directly entered by the user.

Figure 5:
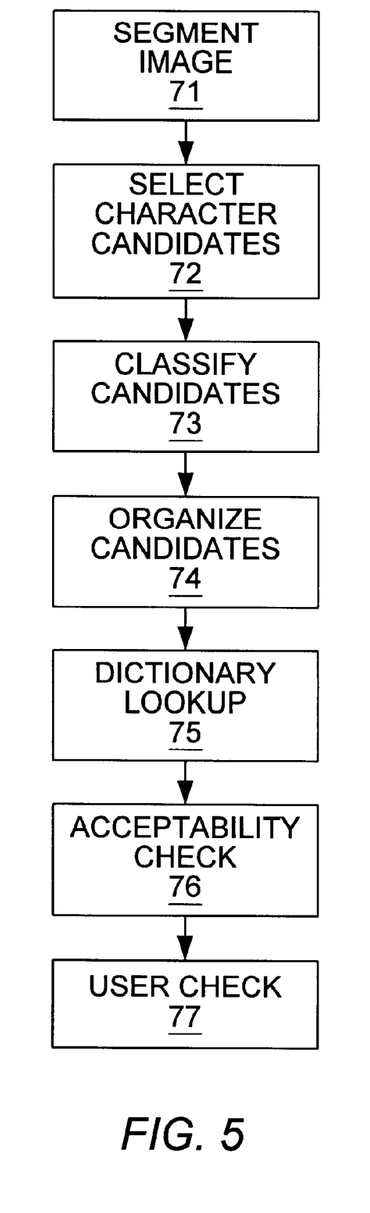
FIG. 5 is a flow diagram illustrating the manner in which the server's handwriting recognition application processes the image data to produce textual data in one embodiment of the invention.

FIG. 5 is a flow diagram illustrating the manner in which the server's handwriting recognition application processes the image data to produce textual data. An off-line, bitmap recognition system is used in this embodiment. It is assumed in this instance that the user's handwriting is not contained in a form, but is instead free-form input to the graphics tablet. Further, in one embodiment, the handwriting image is transmitted to the server in segments as they are generated by the graphics tablet. This may serve both to reduce the peak loading of the server resulting from recognition of the image and to allow the server to provide simultaneous feedback (i.e., recognized characters) to the user. ("Simultaneous" as used here means that some recognized text is transmitted to the set-top box as the user continues to write on the graphics tablet so that the user can see the results of the handwriting recognition.) If the image instead combines text with a known form, the form is first identified and removed. Then, if the handwriting was confined to several boxes or fields on the form, these fields are isolated and handled individually. (Free-form handwritten entries may be distinguished from each other in the same manner as form entries by providing different dialog boxes in which the user can write the entries.)

The handwriting in a field is recognized by first breaking the image into segments showing characters or pieces of characters 71. The individual image segments and combinations of these image segments are selected as character candidates 72. These character candidates are assigned character classes and associated values representative of the confidence with which the recognition application places the segment in the associated character class 73. The character candidates are organized into groups for which a dictionary look-up algorithm can be performed 74. A dictionary look-up determines the word entries which best match the groups of character candidates 75 and may assign a level of confidence to each word. If desired, an acceptability check can be performed to determine whether the confidence level of the recognized words is sufficiently high 76. If the confidence level is too low, the word can be rejected and the image will be considered unrecognizable. The user can also be given the option of checking the textual output of the recognition application and accepting or rejecting all or part of the output 77. After the user has verified the accuracy of the recognized text, the data can be provided to the application executing in the set-top box. It should be noted that the description is intended to be illustrative rather than restrictive and that the process of recognizing vectorized handwriting data or voice data will differ from the foregoing description.

The recognition of the user's handwriting may be assisted by the association of contextual information with the handwriting. If the user's handwriting comprises entries on a form, identifying the type of information requested for each entry may make it easier to interpret the entry itself. For example, an entry in a box requesting a social security number should contain nine digits. A character in this entry which might be interpreted as a "1", an "I" or and "1" must be the numeral "1". The identification of keywords such as "to" or "cc:" may likewise distinguish the handwriting which follows as a name or address.

The system described above can be used with a number of different applications. For example, an interactive television service provider may wish to provide e-mail service to subscribers. The user can select the e-mail application furnished by the service provider and proceed to write the message which he or she wishes to send on the graphics tablet. In the message, the user writes the address of the intended recipient and the message to be sent to the recipient. The graphical data is transmitted to the server, which may segment the image data and then convert the data to text, or it may convert the entire image to text and then parse the text to determine the recipient's address. In an alternate embodiment, only the address of the message is converted to text while the body of the message is transmitted to the recipient as an image. Although the address of the e-mail must be computer-readable so it can be properly routed to the recipient, the body of the message need not be converted to text—the recipient can read the message embodied in the image whether or not it is converted to text data. In fact, it may in some cases be preferable to deliver some messages as image data so that the sender can communicate drawings or other non-textual data. Delivery of the image of a handwritten note may also be preferable because simple text messages may be considered impersonal.

The user may be given the option of selecting an addressee from an address book or a list of previous addressees. A menu can be presented to the user via the graphics tablet to allow selection of one of these addressees. New addressees which are handwritten can be added to the user's address book. The user can also select other options (e.g., sending an image versus sending text only) in the same manner as selecting an addressee. The information which the user enters via the graphics tablet may therefore be a mix of handwriting and selection of particular predefined inputs. A system which uses a microphone for non-textual input may also be configured to allow selection of predefined inputs by using audio prompts and corresponding menus.

In another embodiment, the system may be configured to send faxes instead of e-mail. The foregoing description of the e-mail-configured system is in large part applicable to the fax-configured system. The user can enter a destination fax number and/or addressee via the graphics tablet, and this information can then be transmitted to the server for conversion into textual information. The textual information is then transmitted back to the set-top box and used by the fax application to dial the destination fax. As for the e-mail-configured system, the transmitted fax may be an image of the user's handwriting, or it may be an image of textual information corresponding to the user's handwriting. (It should be noted that in this instance, the system may convert the user's handwriting to textual information so that the information is more legible than handwriting or so that more information will fit on a page, but the transmitted fax will by its nature consist of image data rather than textual data.)

Another example of an application with which the system can be employed is electronic commerce service. Electronic commerce services are those through which the user can buy items or otherwise conduct business. These services include online catalogs and home shopping services. When using an online catalog, the user can browse through the catalog to determine which products he or she would like to order. The user can provide item information via menu entries, but must enter non-standardized information such as a shipping address via the graphics tablet.

In another embodiment, the user can enter his information by voice. The user can use a microphone or a telephone handset to provide voice data to the system. The microphone may a special-purpose microphone for use with the interactive television system or it may be a telephone handset. A special-purpose microphone may be connected to the set-top box, or it may be built into a remote control for the system. A telephone handset may be connected to the set-top box, or it may be connected directly to the return path (i.e., telephone line.) The voice data is transmitted to the server, which uses voice recognition software to convert the voice data into textual data. The textual data is returned to the set-top box, where it can be displayed to the user. The user can correct the text or confirm that the text has been accurately generated from the voice data.

While the present invention has been described with reference to particular embodiments, it will be understood that the embodiments described above are illustrative and that the scope of the invention is not limited to these embodiments. Many variations, modifications, additions and improvements to the described embodiments are possible. These variations, modifications, additions and improvements are intended to be within the scope of the invention as detailed within the following claims.

What is claimed is:

1. An interactive television system comprising:

a receiving station (20) configured to receive a broadcast signal, wherein said receiving station is configured to receive executable interactive application code corresponding to an interactive application via said broadcast signal, wherein said receiving station (20) is configured to execute said interactive application, wherein said interactive application includes a function which requires input in a textual format, and wherein said receiving station includes an input device configured to receive non-textual information from a user; and a remote server coupled to said receiving station by a transmission medium, wherein said server is configured to receive said non-textual information from said receiving station and to convert said non-textual information into textual information, wherein said server is further configured to provide said textual information to said interactive application.

2. The interactive television system of claim 1 further comprising a broadcast station coupled to said receiving station by a broadcast channel.

3. The interactive television system of claim 2 wherein said server is coupled to said broadcast station and wherein said transmission medium comprises a return path between said broadcast station and said receiving station.

4. The interactive television system of claim 3 wherein said receiving station includes a first modem, wherein said broadcast station includes a second modem and wherein said return path comprises a telephone line coupled to said first and second modems.

5. The interactive television system of claim 3 wherein said return path comprises a portion of the bandwidth of said broadcast channel between said broadcast station and said receiving station.

6. The interactive television system of claim 1 wherein said input device comprises a graphics tablet.

7. The interactive television system of claim 6 wherein said graphics tablet comprises a digitizer configured to generate data corresponding to handwriting inscribed thereon.

8. The interactive television system of claim 7 wherein said graphics tablet further comprises a display overlaid with said digitizer and configured to display an image of said handwriting as said handwriting is inscribed on said digitizer.

9. The interactive television system of claim 1 wherein said receiving station further comprises a display and wherein said receiving station is configured to present said textual information on said display for verification of said textual information by said user.

10. The interactive television system of claim 1 wherein said input device comprises a microphone.

11. A set-top box for use in an interactive television system, said system having a remote server configured to convert non-textual information to corresponding textual information, the set-top box comprising:

receiving means (31) configured to receive executable interactive application code corresponding to an interactive application via a broadcast signal;

a microprocessor configured to execute said interactive application, wherein said interactive application includes a function which requires textual information from a user;

an input device for receiving non-textual information from said user; and transmitting means coupled to said input device for transmitting said non-textual information to said remote server; and wherein said receiving means is configured to receive said corresponding textual information from said server, and convey said corresponding textual information to said microprocessor for use by said interactive application.

12. The set-top box of claim 11 wherein said input device comprises a graphics tablet configured to receive handwriting inscribed thereon by said user and wherein said non-textual information comprises digitized information corresponding to said handwriting.

13. The set-top box of claim 11 wherein said input device comprises a microphone configured to receive voice information.

14. The set-top box of claim 11 wherein said transmitting means comprises a modem.

15. The set-top box of claim 11 wherein said receiving means comprises a broadcast receiver.

16. The set-top box of claim 11 wherein said microprocessor is configured to prompt said user for said non-textual information, to receive said non-textual information and to provide said non-textual information to said transmitting means.

17. A method in an interactive television system for providing textual input to an interactive application executing in a set-top box of said system, the method comprising:

receiving a broadcast signal, wherein said broadcast signal comprises executable interactive application code corresponding to an interactive application, wherein said interactive application includes a function which requires textual input;

executing said interactive application;

providing information in a non-textual form to said interactive application in said set-top box;

conveying said information in said non-textual form from said set-top box to a server;

converting said information from said non-textual form to a textual form in said server;

providing said information in said textual form to said interactive application.

18. The method of claim 17:

wherein said non-textual form of said information comprises images of characters; and wherein providing said information in said non-textual form comprises drawing said images on a graphics tablet coupled to said interactive television system.

19. The method of claim 17:

wherein said non-textual form of said information comprises digitized image data; and wherein providing said information in said non-textual form comprises drawing images of characters on a graphics tablet coupled to said interactive television system and digitizing said images and produce said digitized image data.

20. The method of claim 17:

wherein said non-textual form of said information comprises images of characters; and wherein converting said information from said non-textual form to said textual form comprises executing a handwriting recognition application on said server and providing said images to said application to produce said textual form of said information.

21. The method of claim 17:

wherein said non-textual form of said information comprises voice data; and wherein providing said information in said non-textual form comprises speaking into a microphone coupled to said interactive television system and said microphone producing said voice data from spoken words.

22. The method of claim 17 wherein converting said information from said non-textual form to a textual form in said server comprises converting said non-textual form of said information to ASCII characters.

* * * * *